United States Patent [19]

Tasch et al.

[11] Patent Number: 5,243,754
[45] Date of Patent: Sep. 14, 1993

[54] APPARATUS FOR SEVERING OF AN OIL FILTER, SEPARATING THE COMPONENTS OF THE FILTER AND CRUSHING OF THE SAME TO FACILITATE RECYCLING OR WASTE DISPOSAL THEREOF

[75] Inventors: Uri Tasch; Yehoshua Meiseles; Amos Levin, all of Baltimore; David L. Manion, South Ferndale; Patrick J. Kalup, Halethorpe, all of Md.

[73] Assignee: University of Maryland Baltimore County, Baltimore, Md.

[21] Appl. No.: 903,443

[22] Filed: Jun. 24, 1992

[51] Int. Cl.$^5$ .............................................. B23P 19/04
[52] U.S. Cl. .................................... 29/801; 29/33.52; 29/403.2; 29/426.3; 29/564.1
[58] Field of Search ................. 29/426.2, 426.3, 426.4, 29/426.5, 240, 801, 33.52, 564.1, 564.3, 564.7, DIG. 67, 822; 82/92, 101; 29/403.2, 403.3

[56] References Cited

U.S. PATENT DOCUMENTS

| 3,900,948 | 8/1975 | Kammeraad | 30/17 |
| 4,418,460 | 12/1983 | Ruth | 29/426.3 |
| 5,067,529 | 11/1991 | Gonzalez-Miller | 81/3.2 |
| 5,109,763 | 5/1992 | Morris et al. | 100/48 |
| 5,182,842 | 2/1993 | Ross et al. | 29/240 |

Primary Examiner—Mark Rosenbaum
Assistant Examiner—Kenneth J. Hansen
Attorney, Agent, or Firm—Sughrue, Mion, Zinn, Macpeak & Seas

[57] ABSTRACT

Apparatus cyclically severs a cap from one end of an oil filter canister and permits separation of the components of the filter and crushing of those components. A front plate extends vertically upwardly from a table top and supports the canister whose axis is horizontal. A plurality of rotatable wheel cutters move radially into contact with the outer periphery of the canister to support the canister, captured behind the cutter wheels. A vertical back plate moves horizontally across the table top and supports a rotatable block carrying sharp horizontally projecting impaling pins which penetrate the bottom of the canister. A rotary air wrench drives the rotary block causing severance of the cap. During movement of the back plate rearwardly, the canister is separated from the cap, and from the internal hollow filter element captured by a filter element gripper mechanism. The gripper mechanism is axially retractable thereby releasing the filter element. The filter element falls downwardly by gravity and the canister is automatically released after separation from the oil filter element. The back plate then moves towards the front plate, and the canister and the filter element are serially crushed. Retraction of the cutter wheels permits the captured cap to fall.

31 Claims, 6 Drawing Sheets

CAP 70a

FILTER ELEMENT 70b

CANISTER 70c

APPARATUS FOR SEVERING OF AN OIL FILTER, SEPARATING THE COMPONENTS OF THE FILTER AND CRUSHING OF THE SAME TO FACILITATE RECYCLING OR WASTE DISPOSAL THEREOF

FIELD OF THE INVENTION

This invention relates to the recycling and disposal of used automobile and light truck oil filters and more particularly to an apparatus which severs the cap of the oil filter, effects separation of the cap of the canister and the filter element, crushing of the canister and filter element, and separately dispenses the cap, and crushed filter element and canister into underlying recycling containers.

BACKGROUND OF THE INVENTION

Waste handling is a significant problem in the world today. The Federal Environmental Protection Agency has identified used oil filters as hazardous waste and the disposal of used oil filters is quite restricted. Automobile dealerships, garages, and fast oil-changing stores are currently paying for the disposal of automobile oil and light truck oil filters by the volume. In order to reduce the volume of used filters, such businesses employ crushers for crushing the oil filter to reduce the filter disposal expense. Such oil filter crushers, however, make no attempt to recycle the components of the oil filter, nor to attempt to recoup the disposal expense of nonrecyclable components of the oil filter.

It is therefore a primary object of the present invention to provide an apparatus of a semiautomatic or automatic type, which separates the cap of the oil filter from the canister, permits removal of the used oil filter element, and which automatically separates the cap, oil filter element and canister while at the same time, crushing the oil filter element and the canister, subsequent to physical separation of the same.

It is a further object of the present invention to provide such automated severing, component crushing, and separating apparatus for automobile and light truck oil filters, which processes oil filters of varying diameter and axial length, which simultaneously crushes both the filter component and the canister, which facilitates the collection of used oil within the filter element, which is of relatively low cost, and which utilizes gravity in the component separation step.

It is a further object of the present invention to provide such apparatus, which secures the filter in place, severs the cap from the hollow cup like canister, which removes the filter canister axially from the filter element, which serially crushes the canister and filter element to reduce their volume, which effects gravity drop of the cap, crushed filter element and crushed metal canister into separate bins while collecting the oil released from the filter element within a pan, thereby permitting the metal components and the oil to be recycled, and the crushed filter element to be used for fuel in fossil power plants.

DESCRIPTION OF THE PREFERRED EMBODIMENTS

Figure 1:
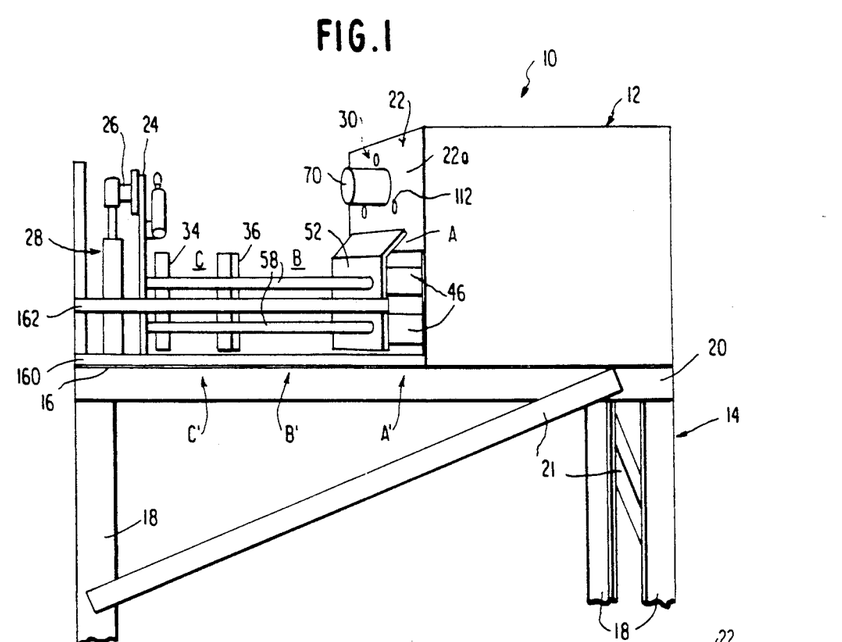
FIG. 1 is a schematic view, partially broken away, of an apparatus forming a preferred embodiment of the invention for the automatic severing of an oil filter, for separating waste oil, the severed cap, the filter canister and filter element of such filter, and for crushing the filter element and filter canister.

Referring first to FIG. 1, the apparatus for severing of the top of the oil filter of an automobile or light truck oil filter, for separating of the canister from the top and removal of the interior filter element and for crushing and recycling or waste disposal of the filter components is indicated generally at 10. The apparatus 10 consists of an enclosure or cover partially shown at 12, about and integrated to an open frame indicated generally at 14. The frame 12 comprises a horizontal table top 16 supported by a plurality of vertically upright legs 18 interconnected by horizontal cross beams 20, and reinforced where necessary by diagonal reinforcing struts 21. The apparatus 10 may be stationary, or may be made readily mobile by attaching canisters or the like to the bottoms of legs 18. Further, for waste collection and recycling purposes, the horizontal cross beams 20 beneath the table top 16 may constitute an open framework capable of supporting a plurality upwardly open separate cylindrical or rectangular, containers or receptacles for receiving the severed cap, the crushed filter element and crushed canister, those areas for underlying containers or receptacles being labeled A, B, and C, respectively.

Additionally, since the used oil filter contains a certain volume of used oil, upon severance of the oil filter cap from the canister proper, at one end of the canister, the oil readily escapes and falls by gravity in the direction of the table top 16. The oil is preferably collected by means such as a pan (not shown), which permits by gravity flow or otherwise, oil to flow into a further container or receptacle (not shown) but located beneath the table top 16 and in a condition for removal from beneath that table top to one side or the other of apparatus 10.

In that regard, the cover or enclosure 12 is preferably formed of thin sheet metal completely about the open frame 14 and extending both above the table top 16 and about the volume defined by the table top, the vertical table legs 18, and the horizontal cross beams 20. Such cover or enclosure may include either removable panels or hinged doors, lids etc. (not shown), for selective access to the receptacles A, B, C, or the components of the apparatus performing the severing and crushing functions.

Preferably, the cross beams 20 of the open framework 14 carry a horizontal shelf (not shown) beneath the table top 16 for supporting the containers., inclusive. In these figures, the cover or enclosure 12 has been purposely eliminated to facilitate viewing the components of the apparatus 10. The principle components of such apparatus include a fixed or stationary front plate indicated generally at 22, which rises vertically upwardly from the table top 16 and formed of sheet metal, and which extends transversely of the table top, and faces in the direction of a generally coplanar, vertical, longitudinally moveable, rear plate or back plate, indicated generally at 24. Fixedly mounted to the back plate 24, to the rear thereof is a rotary chuck 26, rotatably mounted on the movable back plate. Mounted to the front of the front plate, is a pipe cutter mechanism or assembly 30. Projecting through an aperture within a bushing carried by the fixed front plate, is a filter element gripper mechanism or assembly, indicated generally at 32, FIG. 2A.

To facilitate series crushing of the canister after the filter cap is severed therefrom at one end of the canister, and the removable filter element, the longitudinally movable back plate 24 has mounted thereto, on the front surface thereof, a crushing plate indicated generally at 34. Loosely linked to the longitudinally movable back plate 24, is a separator plate 36 interposed between the crushing plate 34 and the front plate 22 and situated so as to be driven horizontally by the moveable back plate 24, in the direction of the front plate 22. To effect longitudinal, horizontal movement of the back plate 24, above the table top 16, the apparatus is provided with a air cylinder assembly indicated generally at 42, in the illustrated embodiment consisting of four air cylinders 46 in dual, tandem arrays.

Figures 2, 2A:
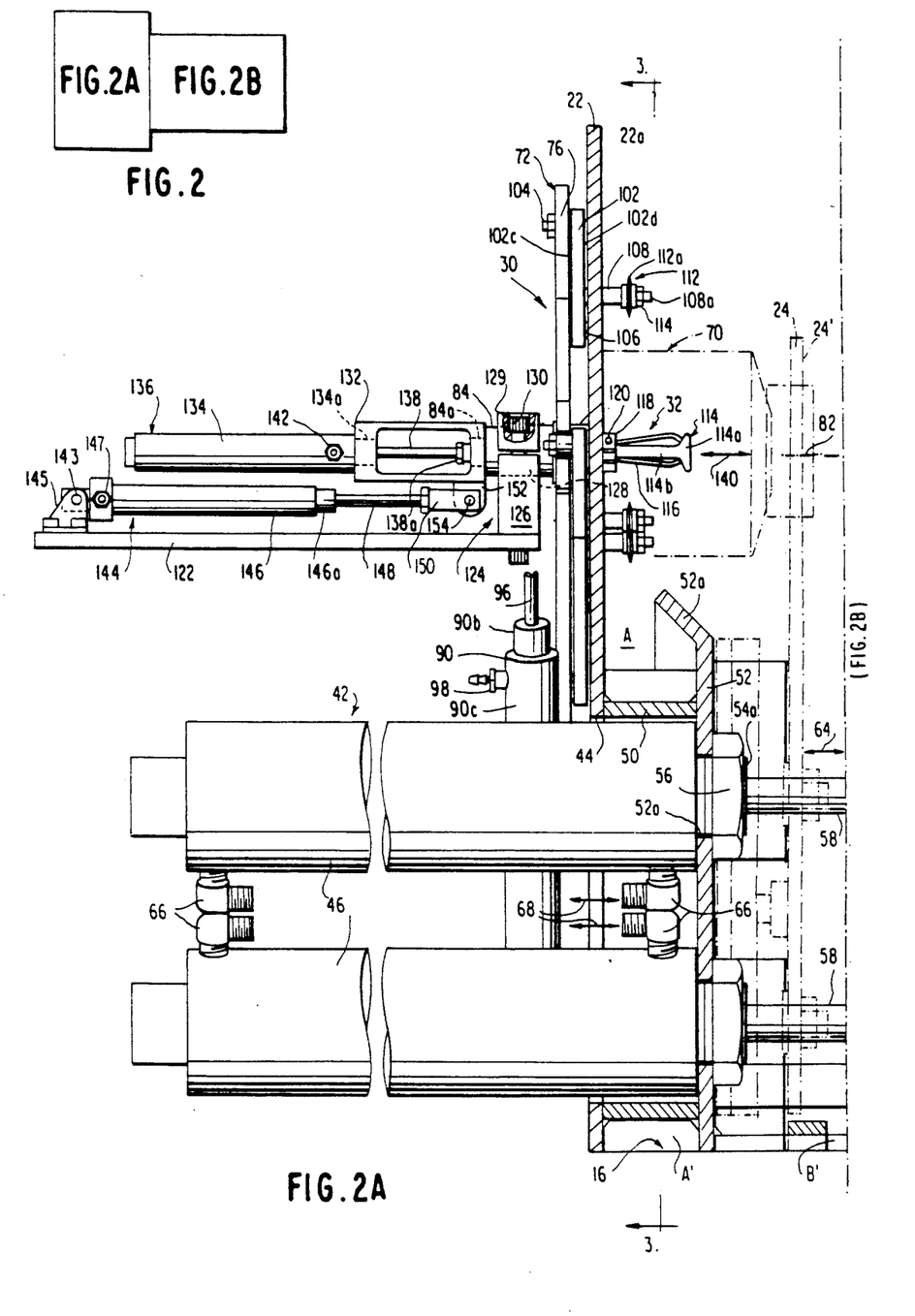
FIG. 2 is a side elevational view of a portion of the apparatus of FIG. 1, consisting of FIGS. 2A, 2B.
Figure 2B:
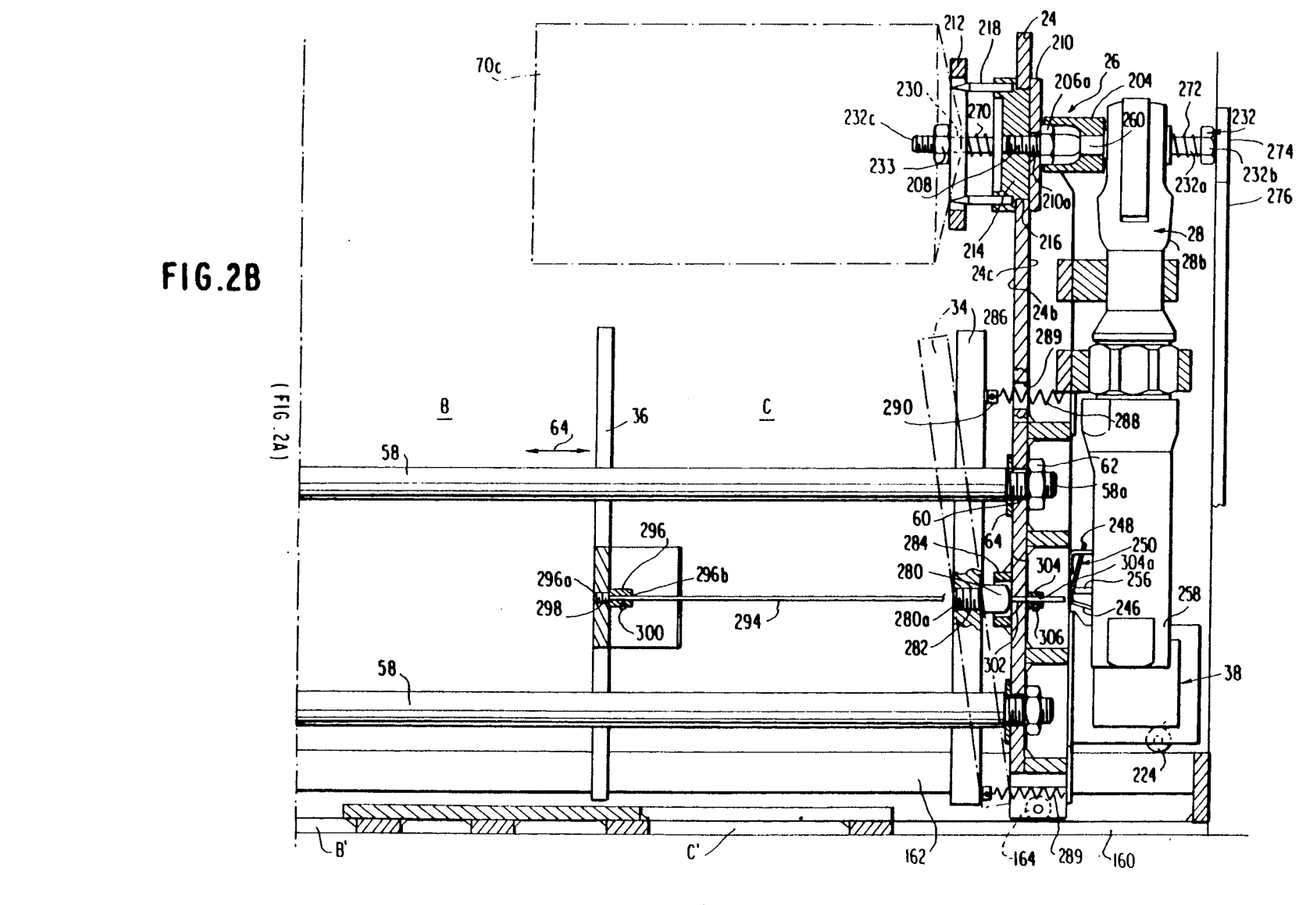
Figure 3:
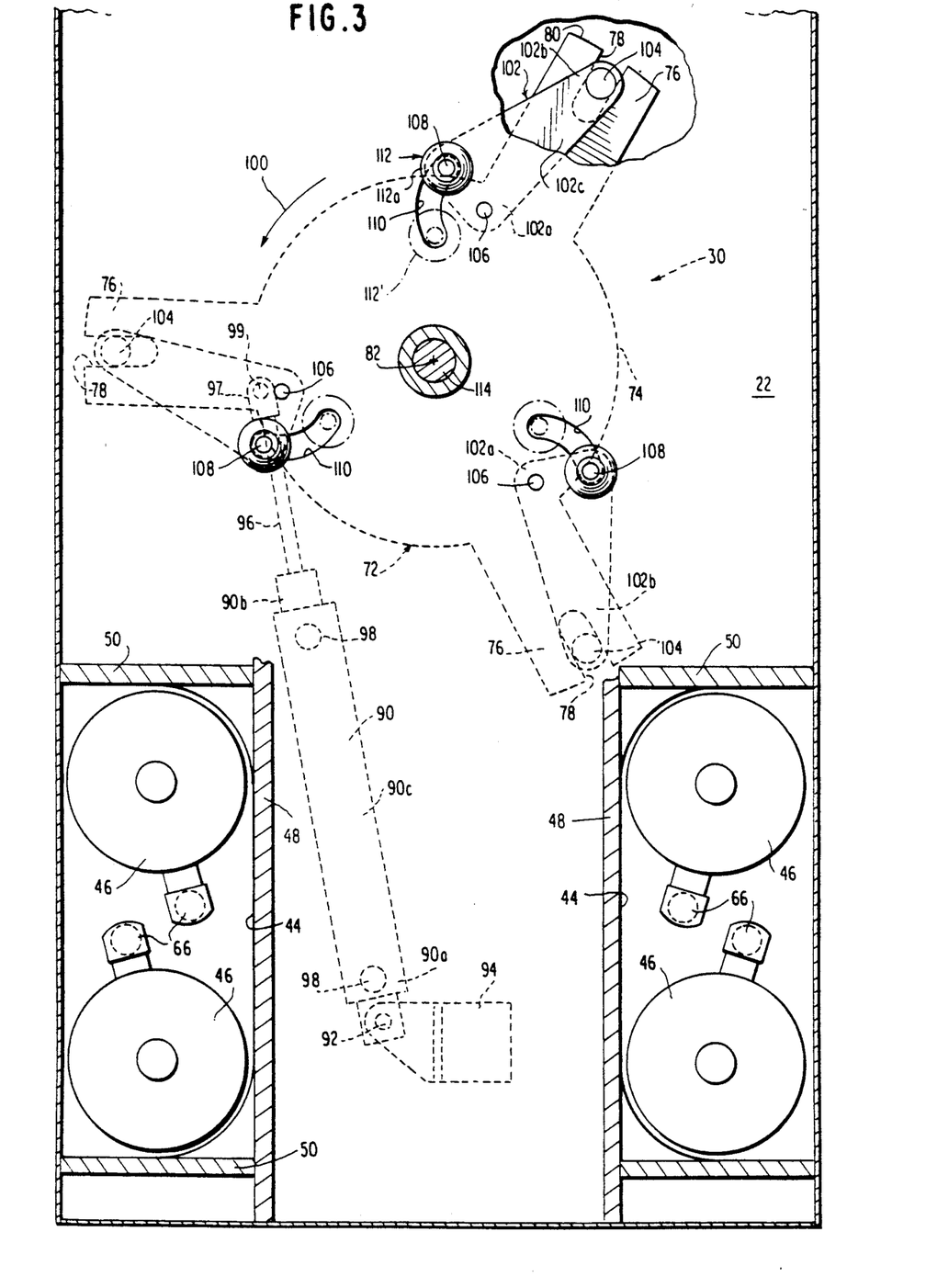
FIG. 3 is a transverse vertical sectional view of the apparatus of FIG. 2A, taken about line 3—3.

Referring to FIGS. 2A, 2B and 3, the fixed front plate 22 is welded or otherwise fixed at its bottom to table top 16 and rises vertically, upwardly therefrom. Within opposite sides of the fixed front plate 22 there are provided a pair of respective vertical, rectangular cutouts 44 which permit tandem air cylinders 46 to project therethrough. To facilitate the mounting of the tandem air cylinders 46, two to each side of the apparatus, vertical and horizontal plates 48 and 50 form a network. The plates 48 and 50 being welded to the vertical fixed front plate 22, and to a short height vertical wall 52.

The tandem air cylinders 46 at their rear ends have reduced diameter, outwardly threaded, cylinder portions 54a bearing lock nuts 56 which abut vertical wall 52, FIG. 2A. The wall 52 is apertured at 52a to permit the reduced diameter cylinder portions 54a to project therethrough. Projecting outwardly of the portions 54a of the cylindrical housings 54 of air cylinders 46 are air cylinder piston rods 58 whose reduced diameter ends 58a, project through apertures 60 within movable back plate 24, FIG. 2B. The peripheries of the reduced diameter portions of the 58a of the piston rods are threaded and carry lock nuts 62 on one side. Washers 64 are carried by the reduced diameter threaded ends 59a of the piston rods, which washers abut a shoulder of the piston rods on the opposite side of the moveable back plate wall 24. Thus, extension and retraction of the piston rods 58 horizontally in the direction of the doubleheaded arrow 64, FIG. 2 causes the moveable back plate 24 to move between the full line, first position, FIG. 2B, and a dotted line, second position, FIG. 2A. In order to project and retract the piston rod 58 of the tandem air cylinders 46 at each side of the apparatus, those air cylinders are provided with inlet and outlet fittings of T-shape, indicated generally at 66, FIG. 3. Compressed air at a pressure of 100 p.s.i.a. for example, is caused to enter and exit from fitting 66, as indicated by the doubleheaded arrows 68, FIG. 2A. The application of and removal of the compressed air from opposite sides of the piston internally of the air cylinders 46 is described hereinafter in the discussion of the operation of the apparatus and the pneumatic circuit, FIG. 5.

Figure 6:
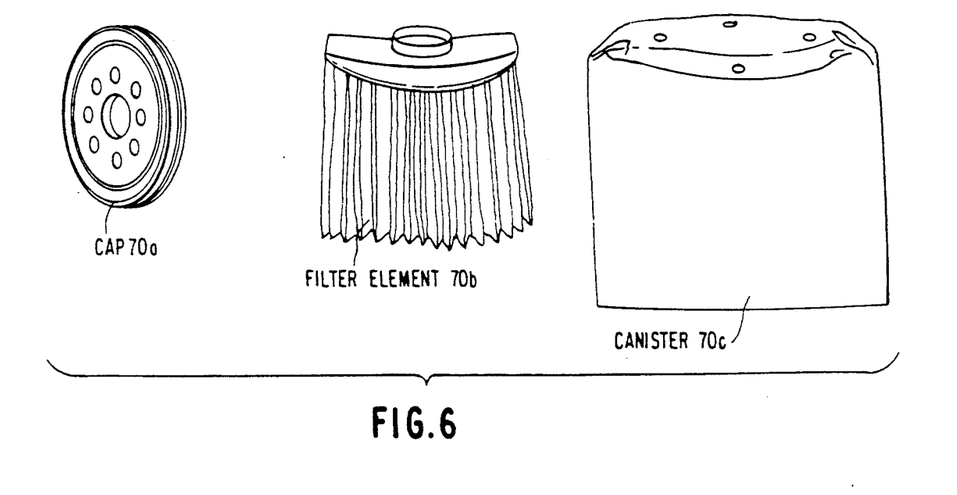
FIG. 6 is an exploded view of the severed top, and the crushed filter element and canister of a typical automobile or light truck filter to which the apparatus of the present invention has application.

As described previously, the function of the apparatus 10 is to sever a cap 70a, FIG. 6 from one end of the canister 70c of oil filter 70 and permit the separation of these parts and removal of the filter element 70b from the interior of the canister 70c and, to facilitate crushing of canister 70c and the filter element 70b as shown in the exploded view, FIG. 6.

Referring again to FIGS. 2, 3 and 7, a principle element of the apparatus is the pipe cutter mechanism 30. The pipe cutter mechanism 30 includes a rotary cutter drive disk or plate, indicated generally at 72, of circular disk form, and of a diameter of approximately 6 in., in the example shown, having a circular periphery 74 and, having at 120° circumferentially spaced positions, integral, radially outwardly projecting arms 76. Those arms, each include a radial slot 78, which projects radially inwardly from the outer peripheral edge 80 of the arm 76. The disk 72 is mounted for rotation about its horizontal axis 82, on a hollow cylindrical bushing or sleeve 84, which passes through an axial bore 86 of the fixed plate 22. In turn, the rotary cutter drive disk 72 includes an axial bore 88, FIG. 7, which is sized to and fits on the exterior periphery of the fixed sleeve 84 for rotation thereabout and retained by spring clip 89. As a result, the disk 72 may be rotated through a limited angle such as 60°.

The apparatus 10 is provided with an air cylinder 90, for example a Bimba 063-DXB air cylinder, having a lower end, FIG. 3 pivotally mounted via pin 92 to a fixed bracket 94. The bracket 94 is welded to the front plate 22, or otherwise fixedly attached to frame 14. Projecting outwardly from an opposite, reduced diameter end 90b of the linear motor air cylinder casing 90c, is an extendable and retractable piston rod 96. The piston rod 96 at its outer end carries an L-shaped coupling member 97 which is pivotably attached via pin 99 to the rotary cutter drive disk 72, radially outwardly of the pivot axis 82 thereof. The air cylinder casing 90 is provided with fittings 98 at opposite ends which selectively receive or return compressed air from a source, FIG. 5, in a manner to be discussed in some detail hereinafter. The stroke of the piston rod 96 is such that the rotary cutter drive disk 72 rotates 60° as indicated by arrow 100, thereby shifting the drive disk arms 76 through that degree of rotation.

As seen in FIGS. 2 and 3, the pipe cutter mechanism 30 additionally includes three pipe cutter support arms indicated generally at 102 which are of right triangular plan shape. The pipe cutter support arms 102 each have a wide base portion 102a and a narrow, opposite end portion 102b. Projecting outwardly from one face 102c of the narrow end portion 102b of each pipe cutter support arm 102 is a pipe cutter support drive pin 104 which is of diameter less than the width of the slot 78 formed on the rotary cutter drive disk 72 and the pin 104 is positioned therein. The base portion 102a of each pipe cutter support arm is rotatable supported on the fixed front plate 22 by a small diameter pivot pin 106 which projects towards the opposite face 102d of each pipe cutter support arm 102, to the opposite side from drive pin 104. Pivot pins 106 rotatably mount the arms 102 to the fixed front plate 22, so that the pipe cutter support arms readily pivot about the horizontal pivot axis of the pivot pin 106. Further, to the opposite side of the base 102a from pivot pin 106, pipe cutter mounting shafts 108 are fixed to the base 102a and project outwardly at right angles to face 102c of the pipe cutter support arm. Shafts 108 function as a cam followers and are of a diameter less than the width of respective arcuate short length cam slots 110 within the fixed front plate 22, within which they project. The slots 110 permit the cam follower shafts 108 to move through an arc of 60° responsive to the extension and retraction of piston rod 96 of air cylinder 90.

Further, the end of cam follower shafts 108 project beyond the rear surface at 22a of fixed front plate 22, and terminate in reduced diameter threaded end portions 108a, which carry rotatable pipe cutter disks or wheel cutters 112. Nuts 114 on the reduced diameter threaded portions 108a of the cam follower shafts 108 maintain the cutter disks 112 on the shafts for free rotation about the axis of the pipe cutter disks. It may be appreciated, three such assemblies are arranged at 120° circumferentially spaced positions so that the pipe cutter disks 112 may be shifted through the extent of the arcuate cam slots 110 within the vertical fixed plate 22 from the full line positions shown in FIG. 3 at 112, to the dotted line position shown at 112' during rotation of the radial arms 76 of drive disk 72 through the 60° angle of rotation as evidenced by arrow 100, FIG. 3.

In shifting from the full line position shown in FIG. 3 to the dotted line position thereof, the pipe cutter disks 112, each have a large diameter peripheral cutting edge 112a, FIGS. 2 and 3, engage the periphery of the filter canister 70c, just behind the cap 70a. The air cylinder 90 exerts a force on the peripheries of the cutter cutting edges 112a, such that the cutting edges 112a bite into the metal canister 70c as the filter 70 is rotated about its axis by the chuck 26 via a rotary air motor 28 to the right, FIG. 2, as will be described hereinafter.

The apparatus 10 in terms of the illustrated embodiment, functions to sever the canister 70c from the cap 70a and to separate the filter element and canister components of oil filter 70. The oil filters may range from 3.3 inches to 17 inches in length, and from 3 inches to 4 inches in diameter. Such apparatus will operate with most oil filters employed at this time in automobiles and small trucks (up to ½ ton).

Figure 7:
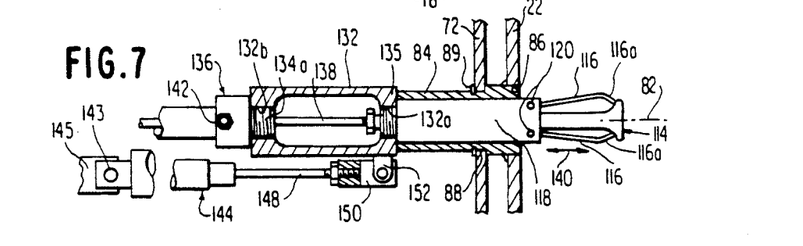
FIG. 7 is a vertical sectional view of a portion of the filter element gripping mechanism.

The second principle aspect of the apparatus 10 mounted to the front plate 22, and facilitating the separation of the filter element 70b is the filter element gripper mechanism or assembly 32. In FIG. 3, the only element of the gripper assembly 32 which is visible, is the projectable and retractable axial cam member 114 which is of T-shape, having a radially enlarged head 114a, and a reduced diameter stem 114b, FIG. 2. The axial cam member 114, FIG. 7, is mounted for movement along its longitudinal axis which is coincident with axis 82 and which causes a radial movement of a plurality of filter element gripping fingers or levers 116. Fingers 116 have inner ends which are pivoted to a housing or bushing 118 by hinges at 120 at right angles to the axis 82 of the axial cam member 114.

It is important that the housing or bushing 118, retract, to the left, FIGS. 2, 7, along with the filter element gripping fingers 116 and the cam member 114, as a unit to permit gravity fall of the separated cap 70a and internal filter element 70b after severance of the canister 70c from the cap 70a and axial removal of the canister 70c from the filter element 70b as will be described hereinafter. In that regard, a gripper mechanism support plate or base 122 is fixedly mounted to open frame 14 or enclosure 12, FIG. 2. Plate 122 extends horizontally, and has a clamp indicated generally at 124, fixedly mounted to the rear end of that plate. Clamp 124 consists of a first block 126 extending vertically upward from the base 22, which block includes a arcuate concave groove 128 within the upper face thereof. A second block 129 mounted thereon, has a downwardly facing arcuate, matching concave groove within the lower face thereof. Clamping screws on opposites sides of the upper block at 130, couple the upper block to the lower block such that the clamp 124 fixedly clamps sleeve 84 to that member aligned with the bore 86, FIG. 7, within fixed front plate 22, through which the smaller diameter bushing 118 passes. Bushing 118 slides axially in sleeve 84.

Sleeve 84 abuts a cylindrical base 135 of an open yoke or adapter 132. Base 135 has an axial bore 132a and an opposite end of yoke 132 has a like cylindrical bore 132b. Bore 132b receives a reduced diameter portion 134a of a cylindrical casing 134 of a single acting, linear actuator 136; in this case, a Bimba 021.5-R single acting, normally open air cylinder.

Projecting outwardly of the cylindrical casing 134 small diameter portion 134a is a piston 138, which is threadably coupled to the front end of the axial cam 114. The axial cam 114 slideably extends through an axial bore of bushing 118, so as to project and retract in the direction of doubleheaded arrow 140, FIGS. 2A, 7, upon energization of the air cylinder 136. Compressed air acts on the internal piston of air cylinder 36, integral with piston rod 138, by selective delivery and removal of such compressed air to one side only of the piston via fitting 142 for the air cylinder 136. The filter element gripper mechanism 32 has elements 114, 116, and 118, as a unit, projected from and retracted into the axial bore 86 within the fixed front plate 22a in sleeve 84.

Such is accomplished by a single acting manually closed air cylinder 144, FIGS. 2A, 7, such as a Bimba 011.5 air cylinder which is pivotably coupled by pin 143 to base 122 via a rear bracket 145. Projecting outwardly from reduced diameter portion 146a of a cylindrical casing 146 of that air cylinder is a piston rod 148 which connects via a clevis 150, to a downwardly projecting tang 152 of the yoke 132. The cylindrical casing 146 is fixed to the base plate 122 such that the selective supply of compressed air to one side of the piston thereof (not shown) of the air cylinder 144, via fitting 147, causes the air cylinder 136 and the yoke 132 as a unit to move towards and away from the fixed front plate 22.

The cap 70a of the oil filter 70 is provided with a tapped internal axial bore which permits threading of the oil filter 70 to a supporting component within the automobile for the oil filter. The filter element gripping fingers 116 and the axial cam member 114 are sized so as to pass through such filter axial bore and to enter freely into the interior of the oil filter canister 70c and interiorly of the tubular filter element 70b of that filter 70, after severance of cap 70a.

The canister 70c of the oil filter is held in position with an internal bore of the filter canister top, axially aligned with axis 82 by engagement of the three circumferentially spaced pipe cutter disks 114 against the outer periphery of the filter canister 70c, rearwardly of cap 70a. After severance of the cap 70a, axial projection of the filter element gripping fingers 116 and the cam member 114 to the position shown in FIGS. 2A, 7, internally of the filter element 70b is effected by extension of piston rod 148 of air cylinder 144. The finger element gripping fingers 116 are forced to pivot radially outwardly such that the bent free ends 116a of fingers 116 engage the inner periphery of the annular filter element, thereby resiliently and or frictionally gripping the filter element 70b after termination of the cutting of the filter canister proper 70c from the cap 70a.

Severance of cap 70a is effected by forcibly rotating the filter 70 about its axis while applying sufficient pressure on the rotary cutter drive disk 72 by the air cylinder 90 to cause the thin cutting edges 112a of the wheel cutters 112 to bite into the metal wall of the canister 70c.

Figure 4:
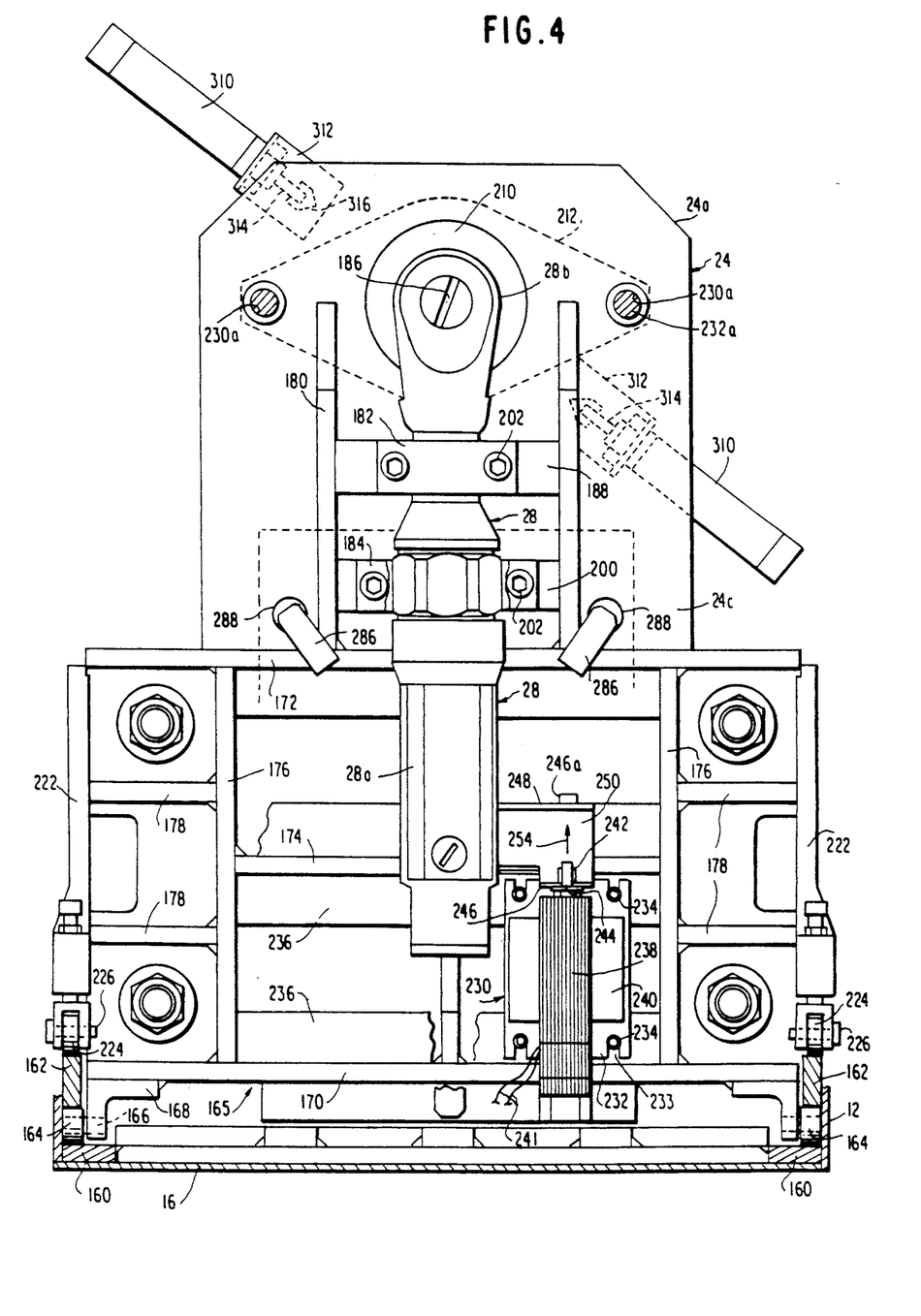
FIG. 4 is a rear elevational view of the portion of the apparatus of FIG. 2.

Rotary drive of the filter 70 to accomplish this action is effected through the moveable back plate 24. In that respect, FIGS. 2B and 4 show the makeup of the sheet metal back plate 24 reinforced by a number of metal strips welded thereto, both vertical and horizontal. As seen best in FIG. 4, the table top 16 forms a bottom wall underlying the fixed and moveable elements of the active portion of the apparatus 10. Rising vertically upwardly from opposite sides of the table top 16 is the cover or enclosure 12. Fixedly mounted to the table top 16 to opposite sides are a pair of horizontal bottom rails 160 of short width. Further, a pair of opposite vertical top rails 162 are welded to the enclosure 12 at some distance above the top of the bottom rails 160 and extending parallel to respective bottom rails 160. The spaces therebetween receive bottom rollers 164 which are mounted for rotation about the axis of short length horizontal axles 166, so as to rest on the bottom rails 160, but also to engage the bottom surface of the top rail so as to form, with L-shaped brackets 168 welded to the bottom of a lower horizontal crossbar 170 carrying the axles 166, a carriage 165 for rear plate 24.

The rear plate 24 extends vertically upwardly from lower cross bar 170 bearing the bottom rollers 164, to a level, above the upper end of the air motor 28. Air motor 28 is an air ratchet wrench. Back plate 24 includes beveled upper corners 24a to opposite sides of that member. The back plate 24 has welded thereto on a rear face 24c, in addition to a lower crossbar 170, an upper crossbar 172, and a middle crossbar 174. The upper crossbar 172 and the lower crossbar 170 extend the full lateral width of the rear plate 24. Such crossbars along with reinforcing vertical bars 176 and 178, reinforce the lower half of the rear plate 24 in addition to short length reinforcing bars 178. Further, two short vertical height reinforcing bars 180 have their lower ends welded to the top surface of the upper crossbar 172 and are of a width on the order of the upper crossbar and extend vertically upward, terminating near the level of chuck 26.

The air ratchet wrench 28 is physically mounted to the rear of the rear plate 24 via a pair of U-clamps 182 and 184 which have arcuate sections spanning about the outer periphery of the air ratchet wrench 28 outer casing, intermediate of the air motor section 28a, and air ratchet wrench head 28b. The U-clamps mount to underlying blocks 188 and 200, respectively, via set screws 202 to opposite sides of the air ratchet wrench 28. Thus, the air ratchet wrench 28 is fixedly held with the axis 186 of the air ratchet head 28b, horizontal and axially aligned with the axis of the grip assembly 32 which it faces. In a typical fashion, the air ratchet wrench supports a rotatable socket 204, FIG. 2B, forming a chuck 26 which faces and engages an octagonal head 206a of a screw 206 having a threaded shank 206b threaded into a tapped bore 205 of circular block 21. Block 21 is mounted for rotation about a horizontal axis 186 in a circular bore 216 of back plate 24. The threaded shank 206b of the screw 206 is threaded into a block 214 and projects through a hole 210a of plate 210 locking block 214 to back plate 24. Block 214 is partially held onto the rear plate 24 by plate 210. Respectively mounted at circumferentially spaced positions on rotatable block 214, and projecting outwardly from the front face 214b of that block, are a plurality (two) of sharp pointed metal impaling pins 218 capable of penetrating the thin rear wall 220 of filter canister 70c. Such action occurs when the back plate 24 moves from the full line position shown to the right, FIG. 2B, to the dotted line position shown to the left, FIG. 2A.

To achieve that action as will be discussed hereinafter, all four air cylinders 46 are subjected to air pressure on the right side of the pistons internally of the same, driving the piston rods 58 from right to left and causing, the carriage 165 supporting the rear plate 24 to move on rollers 164 interposed between rails 160 and 162, from right to left, FIG. 2. Preferably, angular shaped brackets 222 which project rearwardly from the rear plate 24, support upper rollers 224 on short length axels 226 with the rollers riding on the upper surface 162a of the top rail 162, to the rear of the lower rollers 164, thereby taking up moments due to the reaction force acting through the rear plate 24 created by the paneling of the pipe cutter disks 112, during severance of the filter 70 by pins 218.

In order to control the operation of the CRAFTSMAN® Sears, Roebuck & Co., Model No. 875.1888020 air ratchet wrench 28, the apparatus utilizes a simplified compressed air control system. Such control system includes a solenoid indicated generally at 230, FIG. 4, provided with a flat, thin solenoid mounting plate 232 having slots 233 at the four corners thereof, through which pass shanks of small diameter screws 234. The screws 234 are received within tapped holes within horizontal reinforcing plates 236 of back plate 24, aligned with slots 234. The solenoid, 230 whose laminated core is at 238, and having a coil 240, is provided with a normally retracted plunger 242 which, extends through a horizontal aperture 244 within a L-shaped, actuator 250 including a horizontal portion 246. Portion 246 has a tab 246a extending through an aperture within an inverted L-shaped bracket 248 fixed to the rear of back plate 24 FIG. 2. The L-shaped actuator 250 horizontal portion 246 is driven vertically upward as indicated by arrow 254, FIG. 4 about the hinge connection 246a causing a horizontal compressed air flow control pin 256, FIG. 2B, to be driven into the housing 258 of the air ratchet wrench 28. This initiates flow of compressed air to the motor 28a, FIG. 5, of the air ratchet wrench 28, causing the output shaft 260 of that wrench to rotate socket 204 which in turn rotates screw 206, block 214 and the two pins 218 after impaling rear wall 220 of the canister 70c.

However, such action is initiated only after the sharp tapered impaling pins 218 penetrate into that rear wall 220 upon pin impact with the rear wall of the canister 70c. The canister 70c is manually held in position with cap 70a abutting rear surface 22a of front plate 22, prior to engagement of the pipe cutter disk 112 with the outer periphery of the canister 70c, adjacent of the cap 78 to be severed, FIG. 2.

During movement of the back plate 24, FIG. 2, in the direction of the fixed front plate 22 at the moment of impact shown in dotted lines, FIG. 2A, the pins 218 penetrate through the rear wall 220 of the canister 70c and the canister is impaled by the pins 218. Thereafter, canister 70c may be driven about coincident axes 182,

186 by rotation of the block 214 bearing the pins 218 by the then energized air ratchet wrench 28.

However, prior to discussing the elements associated with and partially supported by the rear plate 24, it should be understood that it is necessary to retract the pins 218 with the canister impaled thereby, after severance from the cap 70a, so as to separate the canister 70 from the filter element 70b. When the canister 70c is retracted FIG. 2B, to a position where it can be dropped into a lower part of the apparatus, above the table top 16 and in a position to be crushed along with the filter element 70b in serial fashion, the impaling pins 218 are removed from the rear of the canister 70a.

A diamond shaped canister release plate 212, FIGS. 2B, 4 is provided with aligned holes 230 at opposite corners, through which slidably pass shanks 232a of bolts 232, whose headed ends 232a are to the rear of back plate 24, FIG. 2B.

A pair of small diameter holes 230a, slightly larger than the outer diameter of the shanks 232a of bolts 232 within movable rear plate 24, FIG. 4 permit bolts 232 to slide freely within the pairs of aligned holes 230, 230a. The canister release plate 212 therefor moves freely on the smooth surface of bolt shanks 232a. The terminal end of each shank 232a, is threaded at 232c and has a nut 233 threaded thereto. Interposed between the rear face of the canister release plate 212 and the back plate 24 is a first compression coil spring 270 on each bolt 282, while a second compression coil spring 272 is interposed between the head 232a of each bolt 232 and the rear face 24c of the back plate 24.

As a result, with the canister release plate being biased against nut 233, as the back plate 24 reaches a position where the bolt heads 232b move towards their extreme right position, FIG. 2, the heads impact against a vertical cross plate 274, FIG. 2, supported on opposite sides by vertical risers 276 forming a part of the fixed frame 14. As the back plate 24 moves further to the right, FIG. 2, the coil springs prevent further movement of the canister release plate 212 to the right. The rear wall 220 of the canister 70c impacts against the front surface of the canister release plate 212 driving the canister 70c off the pointed pins 218 such that the now free canister 70c falls by gravity downwardly onto the upper surface of the table top 16, tipped by separator plate 36 to the right, into vertically upright position onto the table top 16.

As mentioned previously, the back plate 24 also physically supports crushing plate 34. Crushing plate 34 is provided, at the center thereof, with a headed pivot pin 280, FIG. 2B. A reduced diameter threaded shank 280a thereof is threaded into a tapped hole 282 within the center of the rectangular crushing plate 34. Further, the headed end of the pivot pin 280 fits within a metal ring 284, which is welded to the front surface 24b of the back plate 24. A pair of brackets 286 are welded to the upper crossbar 172 and vertical reinforcing plates 180. Coil springs 288 are fixedly mounted to the upper ends of the brackets 286, FIG. 4, and project through circular holes 289 within the back plate and are fixed via headed screws 290 to the rear surface of the crushing plate 34 tending to tilt the top of crushing plate 34 obliquely away from the back plate 24 as indicated in dotted lines about a pivot axis defined by the pivot pin 280. A like pair of springs 289 are interposed between the bottom of back plate 24 and the bottom of crushing plate 34. The crushing plate 34 is pivoted at the center to ensure equal reaction force on each of the four air cylinders 46. The crushing plate front surface 34a impacts against the upright filter canister 70c, which has upon release of the canister, fallen onto Table 16 in front of the crushing plate 34.

The two components of the oil filter 70 to be crushed are the filter element 70b and the canister 70c after severing of the cap 70a. For this to occur and to facilitate separation and gravity removal from the area of crushing, it is necessary to employ a vertically upright transverse, separator plate 36 to accomplish that result. Further, the separator plate 36 must be properly positioned to insure that the area to the right of the separator plate 36, FIG. 2B receives the released canister 70c while the area to the left of that separator plate receives the removed, filter element 70b when released by gripping fingers 116. Initially, after severance, the top 70a is retained, gripped by the three circumferentially spaced pipe cutter disks 112. The filter element 70b is gripped by fingers 116. As per FIG. 2, separator plate 36 is vertically upright positioned and moves with the back plate 24 when the back plate moves right to left, being driven by the crushing plate 34.

Two air cylinders mounted to the back plate 24 grasp the canister 70c during severance. Cylinders 310 are released just before back plate 24 reaches its most extended position to the right, so that the canister release plate 212 can push the canister 70c away from pins 218 and cause it to fall to its crushing position.

The back plate 24 pulls the separator plate 36 to the right during a first, return movement of the back plate from left to right after severance of the cap 70a. During that time, the canister 70c is pulled away from the severed cap 70a and away from the filter element 70b which is initially retained by filter element gripping fingers 116. To accomplish that action, a flexible separator plate return wire 294 is fixedly mounted, at one end, to separator plate 36 via a headed screw 296 having a reduced diameter shank 296a threaded into a tapped hole 298 within the separator plate 36, at its center. The headed screw 296, bears a set screw 300 which tightens down on the end of the separator plate return wire projecting into an axial bore 296b of the headed screw 296. The length of the wire between separator plate 36 and headed screw 296 is adjusted to the length of the filter being treated by the apparatus 10. The opposite end of the separator plate return wire projects through a small diameter hole 302 within back plate 24 and a small metal block 304 having a small diameter hole 304a, receives that end of the separator plate return wire 294. A set screw 306 within the block 304 locks block 304 to the return wire. While separator plate return wire may be formed of music wire, having a diameter of 0.061 inches for example, it may be formed of any type wire capable of resisting the pull as the rear plate moves from left to right to place the separator plate 36 in a proper position to receive on opposite sides thereof, the filter element 70b and a filter canister 70c.

The operation of the apparatus will be described in conjunction with the pneumatic circuit of FIG. 5. It is not necessary to have the apparatus 10 function automatically although it is desirable that it functions semi-automatically. As such, the operator manually positions an oil filter 70 removed from the automotive or light truck vehicle, such that the cap 70a end of the oil filter normally bearing the seal (after the old ring seal is removed) faces the rear surface 22a of fixed plate 22, with the canister 70c inside of the three pipe cutters 112 and generally in axial alignment with the gripper mechanism 32, which is projectable internally of filter 70 through a tapped hole in the center of the oil filter cap.

Figure 5:
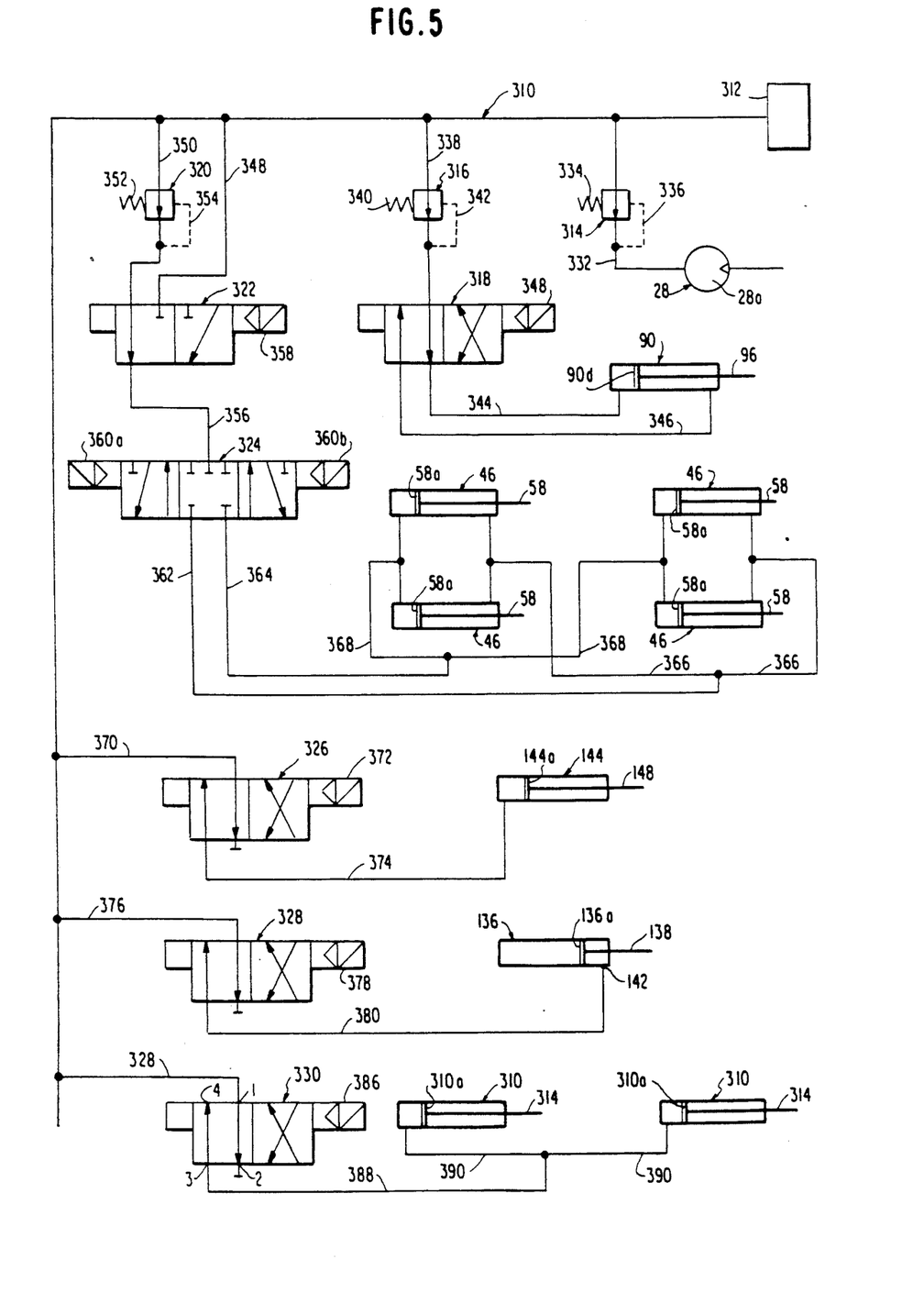
FIG. 5 is a schematic view of the pneumatic circuit of the apparatus of FIG. 1.

Referring to FIG. 5, a compressed air supply line indicated generally at 310, receives compressed air under a pressure of 150 psi for example from a compressed air source 312. The pneumatic circuit includes, as major components, a solenoid operated, return spring type valve, indicated generally at 314, controlling air pressure supply to the air ratchet wrench 28, a similar solenoid operated, return spring type control valve 316 selectively supplying compressed air to a two position solenoid operated control valve 318 selectively delivering compressed air to opposite sides of piston 90d of air cylinder 90 which pivots the rotary cutter drive disk 72. A third solenoid operated return spring type compressed air supply control valve 320, supplies compressed air at a reduced pressure of approximately 60 psi, to a two position solenoid operated control valve 322 which, selectively supplies compressed air at full 150 psi supply line pressure to a three position solenoid operated control valve 324 and which, in turn, supplies compressed air to opposite sides of said pairs of the tandem air cylinders 46 on respective, opposite sides of the apparatus 10. A two position solenoid operated control valve 326 controls the supply of compressed air at full line pressure to the single acting, spring return normally closed air cylinder 144 of the filter element gripping mechanism 32. By a separate line, compressed air is supplied to a double acting solenoid operated control valve 328 for selectively supplying compressed, at full line pressure, to a single acting, spring return normally open air cylinder 136.

A further double acting, solenoid operated control valve 330 controls the supply of compressed air at full line pressure to a pair of single acting, normally closed spring return air cylinders 310 for maintaining the filter canister in position and in contact with diametrically opposite sides of the filter canister 70c with the canister positioned for rotation to effect cutting of the canister top 70a from the canister 70c.

Referring further to FIG. 5, a branch supply line 332 supplies compressed air at line pressure to the rotary ratchet wrench 28 with an appropriate pressure drop at a reduced pressure from line pressure to the rotary ratchet wrench 28. The schematic diagram of FIG. 5 shows the return spring 334, and a feedback line 336 for permitting the solenoid operated control valve 314 to maintain a proper 90 psi compressed air pressure in line 332 leading to the wrench 28.

Branch line 338 connects the main supply line 310 to solenoid operated control valve 318 in which a reduced pressure of the compressed air is maintained via a sensor and feedback line 342 to the control valve 316 with the return spring indicated schematically at 340. The two position solenoid coil 348 shifts the movable valve member of valve 318 from the position shown in FIG. 5 where flow is directed to the left side of piston 90d, with line 346 between the air cylinder 90 and the control valve 318 acting as a compressed air return line. Upon energization of the solenoid actuated control valve 318, the movable element of the control valve shifts to the left, so that the reduced pressure compressed air entering branch line 338, is directed to line 346 and fills the chamber to the right side of piston 90d of the air cylinder 90.

As to the operation of the main air cylinders 46 in dual tandem arrays positioned at opposite lateral sides of the apparatus 10, initially for the cutting operation where the cap 70a is severed from the canister 70b, energization of the solenoid operated, return spring control valve 320 permits compressed air at 100 psi to flow to the two position solenoid operated control valve 322. The return spring of valve 322 is shown schematically at 352, and the sensing line 354 downstream of valve 320 permits by feedback, a control of the air pressure leaving the control valve 320 and directed to the two position solenoid operated control valve 322 downstream thereof. Line 356 connects the outlet of the solenoid operated control valve 322 to the three position solenoid operated control valve 324 and feeds the reduced pressure compressed air to the inlet side of that valve. Selectively by energizing solenoid coil 360a or 360b, compressed air at the reduced pressure of 60 PSI during the cap cutting operation is fed selectively to outlet line 362 from control valve 324 to branch lines 366 to the chambers on the right side pistons 58a, of the four main air cylinders 46 to retract the piston rods 58, thus forcing the back plate 24 to shift to the left, the result of which is to impale the rear wall 220 of the filter canister 70c by pins 218. By operation of the air ratchet wrench 28, rotation of that canister about coincident axes 182, 186 causes severance of the cap 70a from the canister 70c in accordance with the description above and hereinafter. Subsequently, when the canister 70c is released in the position essentially as seen in FIG. 2 to the right, prior to crushing of the canister (and serially, the filter element 70b to the left side of separator wall 36, FIG. 2), solenoid coil 360b is energized shifting, the neutral positioned, movable valve member, of solenoid operated valve 324 FIG. 5, to the left. A connection is then made between inlet line 356 to that control valve, and outlet line 364. Reduced pressure (60 psi) compressed air is delivered to the chambers to the left of pistons 58a for main cylinders 46 to thereby drive the back plate 24 to the right to the full line position in FIG. 2, by extension of the piston rods 58 of those main cylinders.

During crushing, it is necessary to maintain the solenoid operated control valve 320 deenergized so the supply of compressed air is at full line pressure (150 psi) via branch line 348. In this case, the solenoid operated control valve 322 is energized so that inlet line 348 to that control valve is connected to outlet line 356. High pressure compressed air at full line pressure then feeds selectively to the chambers at respective sides of the pistons 58a of the main air cylinders 46. For crushing to occur, the back plate 24 and the crushing plate 34 must again be moved from right to left by retracting all four piston rods 58 of the main cylinders 46. A connection must be made therefore by energization of solenoid coil 360a which connects inlet line 356 of solenoid operated control valve 324 to outlet line 362. The flow divides via lines 366, so that compressed air enters the chambers to the right of pistons 58a all four cylinders 46. After crushing, by movement of the back plate 24 from its full right position FIG. 2 to its full dotted line left position, it must then be returned, a second time to the full line position of that figure. This may be effected by deenergization of solenoid coil 360a, and energization of solenoid coil 360b of three position control valve 324.

In this instance, the solenoid operated control valve 358 may remain as previous and full line pressure directed through lines 348 and 356 to outlet line 364 of solenoid operated control valve 324. Compressed air acting on the left side of the piston 58a, drives the piston rods 58 to the right causing the back plate 24 to shift to the right, thereby pulling the separator plate 36 by means of separator plate return wire 294 to the full line position FIG. 5, set up to separate the released filter element and the severed filter canister in accordance with discussions above and hereafter.

With respect to the filter element gripping mechanism 32, branch line 370 connects to the inlet side of solenoid operated two position valve 326. The unenergized position is shown in FIG. 5 with the inlet line 370 being dead ended at the plug. Operations of the solenoid operated control valve 326 by energization of solenoid coil 372 causes the movable valve member to shift with the inlet line 370 connected t the outlet line 374 to deliver the full line pressure to the chamber on the left side of piston 144a of that spring return air cylinder 144.

Upon deenergization of the solenoid 372, the movable element of the control valve 326 shifts from left to right, back to the position shown in FIG. 5 permitting the air to escape through line 374 and to exit via port 3 thereof to the atmosphere.

Branch line 376 supplies full line pressure compressed air to normally open single acting, spring return air cylinder 136 by effecting upon solenoid coil 378 energization, a fluid connection between inlet line 376 and outlet line 380 leading to fitting 142 of the air cylinder 136. This causes the retraction of piston rod 138 and shift of the piston 136a to the left with the compressed air filling the chamber to the right of that piston. Upon deenergization of the solenoid coil 378 of the solenoid operated control valve 328, the chamber to the right of the piston 136a is open to the atmosphere via line 330 and port connections 3,4 of control valve 328 as shown in FIG. 5.

Branch line 328, connects to ports 1 and 2 of the solenoid operated control valve 330 in the condition shown in FIG. 5 with solenoid coil 386 thereof deenergized. Outlet line 388 is cut off from the branch supply line 328. Energization of the solenoid coil 386 causes the movable valve member thereof to shift to the left, connecting lines 328 and 388. Compressed air, at full line pressure, splits at a T and enters, via branch lines 390 the left side chambers of pistons 310a of the two canister holder air cylinders 310 to drive the pistons to the right, extending piston rods 314. The sharp pointed holding fingers 316 thereof, FIG. 4 impinge against the sides of canister 70c at diametrically oblique opposite points to hold the canister in position particularly facilitating the maintenance of the canister after the top has been severed therefrom, during left to right movement of that canister away from the front plate and prior to release from impalement of impaling pins 218.

Deenergization of the solenoid coil 386 causes return of the movable valve member of control valve 330 to the position shown schematically in FIG. 5 where upon the compressed air is released from the chambers to the left side of pistons 310a of the two air cylinders 310.

With the exception of the manual placement of a used oil filter in a position to be captured by cutter wheels 112 adjacent to cap 70a, FIG. 2, it is preferred that the apparatus 10 operate automatically. Preferably, sensors are employed for sensing the position of the filter 70, as well as the movable elements of the apparatus particularly back plate or rear plate 24 and the components carried thereby. Preferably, Hall effect sensors are employed responsive to the sensing of a magnetic field, such as upon the approach of the back plate 24 for instance towards and just before reaching an extreme position as for instance, at full right as shown in FIG. 2, in full lines, or full left as shown in dotted lines in the same figure. Of course other sensing devices such as micro switches or the like may be employed for connecting a source of electrical power to a central control unit with the appropriate signals being sent to the solenoid coils of the solenoid operated valves, i.e., solenoid coils 348, 358, 360a, 360b, 372, 378 and 386 as well as the solenoid coils (not shown) for solenoid operated control valves 314, 316 and 320.

The sequence of operation of the major elements of the system in accordance with the selective operation of the pneumatic circuit control valves, shown schematically in FIG. 5 follows.

A filter 70 is manually positioned facing and in abutment with the fixed front plate 22, after removing a rubber seal from the filter 70 with the axis of the filter 70 coincident with axis 82 of the filter element gripper mechanism 32. In a semi automatic operation, the operator may initiate action by pressing a push button operated switch, normally an open switch to initially energize solenoid operated control valve 316. The solenoid operated control valve 318 is deenergized with branch line 338 connected to outlet line 344 from that control valve leading to air cylinder 90.

Air cylinder 90 is activated by closure of such switch such that the three pipe cutters 112 are moved by limited rotation of the rotary cutter drive disk 72 counterclockwise, FIG. 3 driving the cam follower pins from their radially outward positions within the cam slots 110, towards their radially inward positions, i.e., from the full line positions at 112, FIG. 3 towards the dotted line positions 112' for facilitating a cap cutting action. The canister 70c is held and retained by the three pipe cutter disks 112, behind the filter cap 70a. The operator manually closes a safety door (not shown) and the recycling process is enabled, preferably by a sensor sensing door closure. This initiates, through a control processor or control panel (not shown) the automatic processes. The back plate 24 which must be positioned to the right FIG. 2 prior to manual placement of the oil filter in position, now moves in a cutting mode of the main air cylinders 46 from right to left. The reduced pressure (60 psi) air supply from air supply line 310 through solenoid operated control valve 320, passes through deenergized solenoid control valve 32 and through solenoid operated control valve 324. The movable valve of control valve 324 is shifted to the right by energization of solenoid 360a such that the 60 psi compressed air enters the chambers of the main air cylinders 46 on the right side of pistons 58a, driving the piston rods 58 to the left and causing the movable back plate 24 to move from right to left.

The back plate approaches a captured filter 70 and all two sharp pins 218 of rotatable block 214 penetrate the rear wall 220 of filter canister 70c. Air cylinders 310 are energized to grasp the canister 70c from opposite sides. Upon operation of the solenoid 230, by a control signal from the control panel, the air motor 28a of the air ratchet wrench 28 is activated by energization of the solenoid actuated, return spring type solenoid operated control valve 314 feeding reduced pressure compressed air (90 psi) to that air motor. Socket 204 operating as a chuck, causes the chuck assembly 26 to rotate the block 214 and the filter 70, by the sharp pins 218, about axis 186. Air pressurization of the air cylinder 90 at 100 psi ensures cutter severance through the canister 70c peripheral wall during rotation of the canister filter 70, to sever the top 70a from the canister proper. Subsequent thereto, the internal filter element gripper mechanism 32 including the axial cam 114 is inserted into the interior of the filter element 70b.

Insertion of the gripper fingers 116 and the axial cam 114 into the interior of the filter 70 is effected first by causing extension of piston rod 148 of air cylinder 144 by energization of solenoid coil 372 of solenoid operated valve 326 thereby connecting branch line 370 with outlet line 374 leading to the chamber to the left of piston 144a thereby driving the piston rod 148 to the right. This causes the assembly 32 to project to the right of fixed front plate 22 as per FIG. 2. The axial cam 114 is then retracted by driving the piston rod 136a of air cylinder 136 to the left, FIG. 2 by supply of compressed air to that single acting air cylinder 136. Such action is effected by energization of solenoid coil 378 of solenoid operated control valve 328, FIG. 5 to connect branch line 376 to outlet line 380 leading to the chamber to the right of piston 136a of air cylinder 136. Driving the piston rod 138 to the left causes the axial cam 114, T head to deflect the pivoted gripping fingers 116 radially outwardly into flexed resilient contact with the interior of the filter element 70b. As the back plate 24 is projected to the right, FIG. 2, together with the metal canister 70c, with the canister 70c held by the two air cylinders 310 near the end of the stroke, air cylinder 136 is reversely operated to cause the axial ca 114 to be projected to the position shown in FIG. 2, the internal filter element gripper fingers 116 are relaxed and moved radially inwardly towards the projected axial cam member 114 releasing the filter element 70b. Since the canister 70c is separated from the filter element 70b, the filter element 70b may fall by gravity toward table top 16 after retraction of the gripping mechanism 32. The air cylinder 144 is caused to retract its piston rod 148 by deenergization of solenoid coil 372, causing the complete assembly of air cylinder 136 and 144 mounted to base plate 122 to move from right to left thereby driving the gripping mechanism 32 to the left side of the fixed plate 42 by spring return of air cylinder piston 144a to the position shown in FIG. 5.

Near the end of the piston stroke of the tandem air cylinders 46 to the right and full piston rod 58 extension of all four air cylinders 46, the back plate 24 reaches a position where the head ends 232b of the two bolts 232, impact against the crossbar 270 of the frame 214, forcing withdrawal of the pins 218 from the rear wall 220 of the canister 70c and stopping the further movement of the canister 70c from left to right. The canister 70c, having been released by deenergization of solenoid coil 386, and return of the pistons of air cylinders 310, then falls by gravity into the C-bin area to the right of the separator plate 36. Simultaneously, the released filter element 70b in full size cylindrical form falls upright into bin B, to the left side of the separator plate 36, FIG. 2. This permits the canister 70c and the filter element 70b to be crushed serially by a further second cyclic movement of the back plate 24 from right to left.

Such action is initiated by a sensor such as a Hall effect element (not shown) sensing the repositioning of movable back plate 24 to the extreme right, FIG. 2 sending a signal to the control panel which results in deenergization of solenoid operated control valve 320 and energization of solenoid control valve 322, FIG. 5. Energization of solenoid coil 358 thereof causes the movable valve member of control valve 322 to shift from the position shown in FIG. 5 to the left, connecting line 348 to line 356. In the crushing operation low air pressure of about 30 psi initiates crushing, and is applied at the end of the crushing process. The much higher compressed air at 150 psi is employed to obtain smooth operation. The compressed air flows to the three position solenoid operated control valve 324 and upon energization of solenoid coil 360a, the three position movable valve member thereof shifts to the right, connecting inlet line 356 of solenoid operated control valve 324 to outlet line 362 thereof, causing compressed air to enter the chambers to the right of pistons 58a of the main air cylinders 46.

During movement from right to left, the upright canister 70c is contacted by crushing plate 34 and the opposite left side of the canister 70c contacts the right side of the separator plate 36. Next, the left side of the separator plate 36 contacts right side of the upright filter element 70b and the other, left side of the filter element is driven into contact with fixed front plate 22. The canister 70c and the filter element 70b are simultaneously compressed with their volume considerably reduced and full stroke of pistons 58a ceases by operation of a suitable sensor to reset control valve 324 to the third (neutral) position, as shown.

In a preferred element, the table top 16 is provided with three transversely extending, relatively narrow and transversely elongated slots. Slot A' is capable of passing through the table top 16 a severed cap 70a, slot B' capable of passing a crushed filter element 70b, and slot C' capable of permitting gravity passage of a released crushed metal canister 70c (minus the severed cap 70a). Since the table slots B' and C' are incapable of passing the uncrushed filter element 70b and uncrushed canister 70c, respectively, such action occurs only during movement of the back plate 24 from left to right after crushing is completed with the back plate 24 again at or near the dotted line position shown in FIG. 2, to the far left.

This cycle terminates with the separated cap 70a falling by gravity into the area between the fixed vertical front plate 22 and the extreme left position of movable back plate 24 as shown in dotted lines in FIG. 2. Prior to opening of the enclosure, as by specifically opening one or more doors and having access interiorly of the enclosure, preferably the back plate 24 is again driven from left to right by extension of piston rods 58a from the positions shown in FIG. 5 at the left, to the right. Such action is effected by energization of solenoid coil 360b which drives the movable valve member to the left causing connection between lines 356 and 364 with feed of either the cutting cycle lower pressure of 100 psi compressed air to the left side chambers to the chambers within the main air cylinders 46 to the left of pistons 58a or, full 150 psi line pressure through line 348. Such pressure is selectively controlled by solenoid operated control valve 322.

While not completely necessary, it is preferred that the canister 70c be held in a desired position on back plate 24 irrespective of the extent of travel of the back plate 24. The back plate 24 is provided with a mechanism for effecting that action as well as orientation of the filter 70 and is particularly useful during severing of the filter cap 70a from the oil filter canister 70c.

In order to hold the canister 70c together with the back plate 24 during severance of the filter top 70a from the filter canister 70c, the apparatus employs the canister holder air cylinders 310 as seen particularly in FIG. 4, each fixedly mounted at one end to brackets 312. The brackets 312 are generally L-shaped, and are fixed to the front surface 24b of the back plate 24. Preferably, the air cylinders 310 are diametrically opposite each other and at an oblique angle with respect to a vertical axis passing through the air ratchet wrench 28. Fixed to the projecting end of the piston rod 314 of each air cylinder 310 is a pointed head 316 which lightly impacts against the metal canister 70c once the sharp pointed pins 218 of rotatable block 214 penetrate the rear wall 220 of the canister 70c. Thus, after termination of the movement of the rear plate 24 horizontally from right to left, FIG. 2, to the dotted line position, the air cylinders 310 may be simultaneously actuated driving the pointed heads 316 of the piston rods of those assemblies into the metal canister 70c thereby maintaining the canister 70c in proper position during cap severance. This action is effected by energization of normally deenergized solenoid actuated valve 330 by energization of solenoid coil 386 which causes a shift of the movable valve member of that control valve from right to left thereby connecting branch line 328 to outlet line 388, leading to the left side chambers of air cylinders 310. The full line pressure compressed air entering the chambers to the left of the pistons 310a drive the piston rods 314 to the right. Such action may be initiated by a sensor such as a Hall effect sensor (not shown) sensing the position of the back plate 24 at its dotted line position 24' to the left, FIG. 2A. Under a control system which deactivates solenoid coil 386 when the back plate 24 shifts again from the dotted line left extreme position 24' to the full line position shown in FIG. 2 to the right, the movable valve member of control valve 330 shifts by spring return, to the position shown in FIG. 5 cutting off the supply of full line pressure through branch line 328 to air cylinders 310. This permits the air within the chambers to the left of pistons 310a, to escape to the atmosphere through ports 3, 4 of the solenoid operated control valve 330.

The position of the air cylinders 310 are such that the contact between the pointed heads 316 and the canister is axially remote from the area of contact by the pipe cutters 112. Further, after separation of the oil filter cap 70a from the canister 70c, grasping by the pointed heads 316 of the canister 70c facilitates the maintenance of the canister 70c on the pointed pins 218 carried by the longitudinally moveable back plate 24 over its length of travel, prior to release of the canister by operation of the canister release plate 212.

While the description above is to a preferred embodiment and contains specific parameters and location and connection details, these should not be construed as limitations on the scope of the invention and the system in the various figures is exemplary only. The scope of the invention is determined not by the illustrated embodiment, but by the appended claims and their legal equivalents.

We claim:

1. An apparatus for cyclically severing a cap from a canister of an oil filter carrying a filter element, internally of the canister, for separating the components of said filter and for crushing the same to facilitate recycling or waste disposal thereof, said apparatus comprising:

a vertically upright frame, a raised horizontal table top carried by said frame, a vertical front plate fixed to said frame and rising vertically upward from said table top, means carried by said front plate for supporting said filter, means carried by said frame for severing said filter cap from said filter canister, means for axially separating said filter canister from said severed cap, means projectable internally of said filter element for selectively gripping said filter element, means for crushing at least one of said canister and said filter element after axial separation thereof, and means for selective collection of at least said filter element and said canister after crushing of said at least one of said canister and said filter element.

2. The apparatus as claimed in claim 1, further comprising means for selectively releasing said canister from said axial separation means and said filter element from said filter element gripping means for gravity drop of said filter element and said canister onto said table top prior to crushing at least one of said canister and said filter element.

3. The apparatus as claimed in claim 2, wherein said crushing means lies below said cap severing means.

4. The apparatus as claimed in claim 3, wherein said crushing means is a single crushing means acting commonly on said canister and said filter element.

5. The apparatus as claimed in claim 1, wherein said crushing means is a single crushing means acting commonly on said canister and said filter element.

6. The apparatus as claimed in claim 1, wherein said frame supports a back plate for travel horizontally in directions towards and away from said fixed front plate from a first extreme position remote from said front plate to a second, extreme position proximate to said front plate, and wherein said back plate partially comprises said means for crushing at least one of said canister and said filter element during back plate movement.

7. The apparatus as claimed in claim 6, wherein said back plate mounts on a face thereof facing the said fixed vertical front plate, a crushing plate for contact with at least one of said canister and said filter element, and wherein said front plate constitutes a fixed abutment to facilitate crushing of said at least one of said canister and said filter element.

8. The apparatus as claimed in claim 7, further comprising a vertically upright separator plate intermediate of said fixed vertical front plate and said back plate for movement with said back plate towards said front plate and driven thereby, and means carried by said back plate for positioning said separator plate at a intermediate position between said front plate and said back plate during movement of said back plate from said second position to said first position, remote from said front plate and permitting axial separation of said canister from said filter element and wherein, said separator plate being of a height such that the top of the separator plate is free of the area occupied by the canister when being axially separated from said filter element whereby with the back plate at said first extreme position, upon release of said filter element and said axially separated canister after severance from said cap, said released filter element and said severed canister fall by gravity, respectively between the separator plate and the fixed front plant, and said separator plate and said back plate.

9. The apparatus as claimed in claim 8, wherein means loosely couple said separator plate to said back plate such that movement of the back plate from said second position to said first position across said table top, causes the separator plate to follow said back plate, into said position intermediate of said front plate and said back plate to facilitate positioning of said canister and said filter element to opposite sides of said separator plate prior to serially crushing of the same by movement of said back plate from said first position to said second position.

10. The apparatus as claimed in claim 9, wherein said means which loosely couple said separator plate to said back plate comprises a return wire fixed at one end to the back plate and, at an opposite end, to said separator plate, and wherein the length of the return wire is such that when the back plate is in the first position, the separator plate is approximately half way between the back plate and the front plate.

11. The apparatus as claimed in claim 8, wherein said crusher plate is pivotably supported at its center to the face of the back plate proximate to the front plate allowing angular orientation of the crushing plate upon contact with the canister prior to crushing of the canister between the brusher plate and the separator plate during movement of the back plate in the direction of the front plate from said first position to said second position.

12. The apparatus as claimed in claim 6, wherein said table top is provided with narrow, transversely extending slots at longitudinally spaced positions to the side of said vertical front plate in the direction of said back plate, sized and positioned to automatically pass the crushed filter element and the crushed canister through said slots of said table top, for collection in separate receptacles for receiving said crushed filter element, and said crushed canister carried by said frame, beneath said table top and alignable respectively with the slots.

13. The apparatus as claimed in claim 6, wherein said means carried by said table for severing the filter cap from said filter canister, comprises:
at least one cutter element operatively carried by said front plate, on the side of the front plate, facing said back plate and at a position to contact an outer periphery of the filter canister beyond the filter cap abutting the side of the front plate proximate thereto,
means for biasing said cutter element into engagement with said canister periphery, and means for rotating the canister about the axis of said filter for severance of said canister from said cap by said at least one biased contacting cutter element.

14. The apparatus as claimed in claim 6, wherein said severing means further comprises means carried by said back plate and operatively engaging the canister and for rotating said canister about the horizontal axis of the filter.

15. The apparatus as claimed in claim 14, wherein said means for operatively engaging said canister and for rotating said canister about said filter axis comprises a rotary block carried by said back plate for rotation about a horizontal axis coincident with the axis of the canister, and impaling means carried by said block for impaling said canister.

16. The apparatus as claimed in claim 15, wherein said impaling means comprises a plurality of circumferentially spaced sharp pointed impaling pins projecting horizontally from said block, in the direction of said front plate for penetration into a bottom wall of the filter canister.

17. The apparatus as claimed in claim 16, further comprising a canister release plate operatively positioned on said apparatus, in the path of movement of said canister during axial separation from said filter element as severance of the cap from the canister for impingement with the canister to prevent further movement of the canister in the direction of movement of said back plate during travel thereof from said second position to the first position to disengage the impaling means from the canister and release the canister for gravity drop into a position for crushing of the severed canister.

18. The apparatus as claimed in claim 17, wherein, said canister release plate is supported by said back plate, in front of said rotary block, said canister release plate having an aperture therein allowing the impaling pins to project therethrough for impaling a bottom wall of said canister during travel of the back plate from said first position to said second position, and wherein, said canister release plate is resiliently carried on said back plate, on the front wall thereof, facing the front plate such that the canister release plate retracts towards said back plate upon canister release plate impact with the bottom of said canister to permit the pointed impaling pins to penetrate the bottom wall of said canister.

19. The apparatus as claimed in claim 18, wherein said canister release plate is mounted by a plurality of bolts to said back plate, said bolts slidably extending through the back plate at right angles to the vertical plane of said back plate, for relative movement horizontally, wherein a resilient means comprising a first spring is carried by each of said bolts, intermediate of the back plate and the canister release plate, and a second spring is intermediate of the rear surface of the back plate and a head of each bolt, and wherein said frame comprises a cross bar fixedly mounted to said frame, at a position in the path of the head of said bolts such that automatically, prior to completion of the movement from said back plate from said second position to said first position, the bolt heads impact against the cross bar to resiliently restrict further movement of the canister release plate carried by said back plate, in the direction of said back plate first position, thereby stopping the canister release plate and causing the withdrawal of the impaling pins from the back of the canister to release said canister for gravity drop into a position for crushing.

20. The apparatus as claimed in claim 16, wherein said means for rotating said canister about said horizontal axis comprises a rotary air motor operatively coupled to said block for rotation of the block about said coincident axes.

21. The apparatus as claimed in claim 15, wherein said means for rotating said canister about said horizontal axis comprises a rotary air motor operatively coupled to said block for rotation of the block about said coincident axes.

22. The apparatus as claimed in claim 21, wherein said air motor comprises an air driven ratchet wrench mounted to the back plate, and operatively coupled to said rotary block.

23. The apparatus as claimed in claim 22, wherein said air wrench is mounted to said back plate in vertically upright position, and terminates in a horizontal socket facing said back plate, and wherein, said rotary block has mounted thereto, at the axis thereof, a screw threaded to said block and terminating in a radially enlarged polygonal head received within a similarly sized and shaped polygonal recess within said socket.

24. The apparatus as claimed in claim 6, wherein said means for driving said movable back plate towards and away from said fixed front plate, comprises at least one linear motor means, mounted to said frame, and operatively coupled to said back plate, and means for energizing said motor at least one linear means for driving said moving back plate cyclically, between said first and second positions.

25. The apparatus as claimed in claim 24, wherein said linear motor means comprising a plurality of air pistons, said air pistons being mounted to said frame, operatively positioned to opposite sides of said fixed front plate, extending longitudinally, and having an extendable and retractable piston rod at one end thereof, extending in a direction of said movable back plate, and being operatively coupled thereto such that, extension of said piston rods shifts said back plate over said table top, from said second position to said first position, and retraction of the piston rods shifts said vertical back plate, from said first position to said second position.

26. The apparatus as claimed in claim 6, further comprising can holder means carried by said movable back plate and projectable radially into and out of contact with the periphery of the canister for holding the canister in position on said back plate during movement of the back plate from said second position toward said first position to effect axial separation of the canister from the filter element, after severance of the cap from the canister.

27. The apparatus as claimed in claim 26, wherein said can holder means comprises a pair of air cylinders fixedly mounted to the front face of the back plate, at diametrically opposed positions axially facing each other, and wherein said air cylinders include projectable and retractable piston rods projectable axially from an air cylinder cylindrical casing, towards and away from the outer periphery of the canister, and wherein said piston rods terminate at ends remote from the casing, in pointed ends, impingeable against the canister.

28. The apparatus' claimed in claim 1, wherein said cap severing means comprises a plurality of cutter wheels operatively carried by said front plate, at circumferentially spaced positions radially disposed outside the filter and movable radially towards and away from the filter canister, for severance of the cap from the filter canister and wherein said front plate includes means for driving said cutter wheels, radially inwardly and outwardly for contact with an outer periphery of the canister under a biasing force, tending to cause a radial cutting edge of each cutter wheel to penetrate into a peripheral wall of the canister and severance thereof from the cap upon relative rotation of the canister and said cutter wheels 29. The apparatus as claimed in claim 1, wherein said severing means comprises a pipe cutter mechanism including a rotary cutter drive disk carried by said front plate, for rotation about a horizontal pivot axis with the cutter drive disk coaxial with the axis of the filter, and on a side of the front plate opposite to that of the filter, said rotary cutter drive disk having a plurality of integral, radially outwardly projecting arms at circumferential spaced positions, said arms each including a radial slot projecting inward from an outer peripheral edge thereof, and said apparatus further including means for rotating said rotary cutter drive disk through a limited angular rotation about said pivot axis, a plurality of pipe cutter support arms pivotally mounted at an end thereof, to said fixed front plate, radially inwardly of said arms of said rotary cutter drive disk, a cam follower pin mounted to each of said pipe cutter support arms at a radially outward end thereof and positioned within a respective radial slot of said radially outwardly projecting arms of said rotary cutter drive disk, a plurality of circumferentially spaced, arcuate cam slots within said fixed front plate, proximate to said radially outwardly projecting arms of said rotary cutter drive disks, and said pipe cutter support arms each having a pipe cutter mounting shaft fixed to said pipe cutter support arm, to the side of the pivot pin pivotally coupling the radially inward end of said pipe cutter support arm to said fixed front plate, said shafts having a diameter less than the width of the arcuate cam slots, and positioned in said cam slots, said cam slots allowing the cam follower shafts to move through an arc, and wherein wheel cutters are rotatably mounted for rotation about their axis at ends of said cam follower shafts projecting beyond a rear surface of the fixed front plate and the filter cap, such that a radially enlarged cutting edge of the wheel cutters engage a periphery of the canister thereby supporting the filter in place, with the filter cap in abutting contact with the rear surface of the fixed front plate, and wherein, said apparatus comprises means for pivoting of said rotary cutter drive disk about its axis through an angular extent corresponding generally to the angular extent of said arcuate cam slots within the fixed front plate.

30. The apparatus as claimed in claim 1, wherein said means for selectively gripping said filter element and projectable interiorly of said filter element comprises a filter element gripper mechanism, said gripper mechanism comprising a cylindrical sleeve fixedly mounted to said fixed plate and projecting horizontally at right angles thereto and having an axis thereof coincident with the axis of the filter, having the cap thereof in contact in abutment with the rear wall of said fixed front plate, said sleeve projecting through an axial bore within said rotary cutter drive disk and mounting said rotary cutting drive disk for rotation about the disk axis in front of the fixed front plate, said sleeve supporting coaxially and internally, an axially reciprocating hollow cylindrical bushing, a hollow tubular adaptor, fixedly mounted to said bushing, and extending axially from the end of the bushing, in a direction away from said of rotating cutter drive disk, said bushing mounting therein a horizontally reciprocable axial cam, and axially thereof, said axial cam terminating in a radially enlarged head, said bushing pivotally mounting, at an end thereof proximate to said axial cam end, one end of a plurality of filter element gripping fingers circumferentially spaced about said axial cam, with free ends of the gripping fingers abutting the radially enlarged head of axial cam for causing said free ends of said levers to project radially outwardly upon retraction of the axial cam within the bushing by movement of said radially enlarged head in the direction of the fixed front plate thereby driving the free ends of said filter element gripping fingers, into radial engagement with the inner periphery of the hollow filter element, and a first means for moving said adaptor axially to cause projection and retraction of the bushing axially relative to the fixed sleeve, and a second means for axially retracting and projecting said axial cam within said bushing for respectively causing selective engagement and disengagement of the filter gripping fingers with the interior of the inner periphery of the filter element.

31. The apparatus as claimed in claim 30, wherein said first means for projecting and retracting of the bushing within said fixed sleeve comprises a single acting, air cylinder having one end operatively mounted to said frame, and an opposite end terminating in an axial projecting and retracting piston rod pivotally coupled to said adapter and wherein, said second means comprises a reverse, single acting air cylinder fixedly mounted to said adaptor remote from said sleeve, and including a axially projecting piston rod operatively coupled to the end of said axial cam remote from said radially enlarged axial cam head.

* * * * *